(No Model.)
E. T. LIPPERT.
INSERTIBLE SAW TOOTH.
No. 283,623. Patented Aug. 21, 1883.
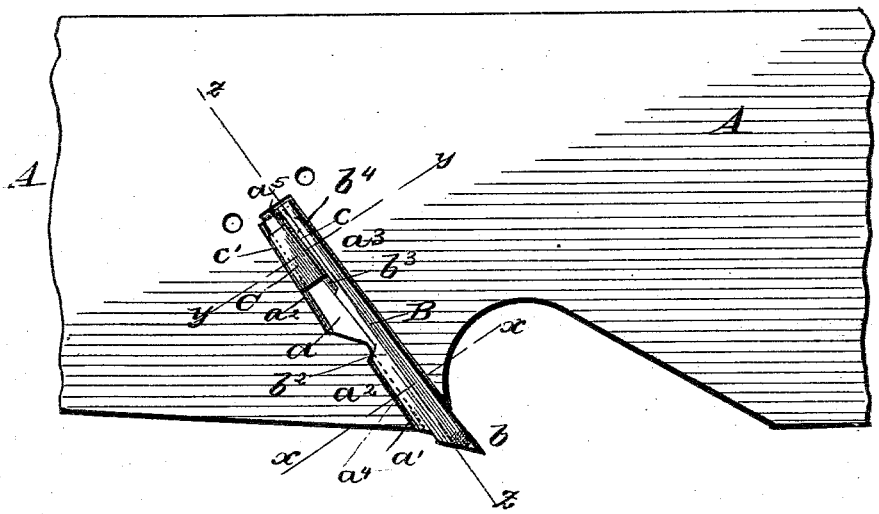
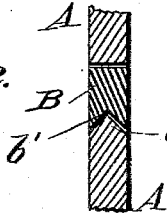
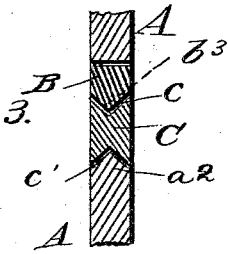
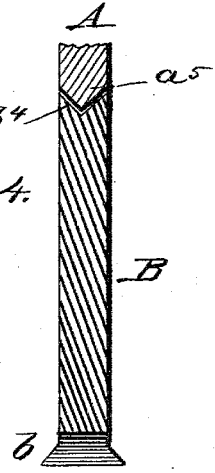
Witnesses:
Phil. C. Dietrich
J. O. McCleary
Inventor:
E. T. Lippert
By Foulé & Co.
Attorneys

UNITED STATES PATENT OFFICE.

ERNST THEODOR LIPPERT, OF SHALER, PENNSYLVANIA.

INSERTIBLE SAW-TOOTH.

SPECIFICATION forming part of Letters Patent No. 283,623, dated August 21, 1883.

Application filed May 12, 1883. (No model.)

*To all whom it may concern:*

Be it known that I, ERNST THEODOR LIPPERT, a citizen of the United States, residing at Shaler township, in the county of Allegheny and State of Pennsylvania, have invented certain new and useful Improvements in Saw-Teeth; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement on my Patent No. 178,450, for removable saw-teeth, the object being to provide a saw with readily-detachable teeth so constructed and combined with a locking-wedge as to be secure and rigid in their connection with the saw.

In the drawings, Figure 1 is an elevation of a portion of a saw provided with my improvement. Fig. 2 is a section on the line $x\ x$ of Fig. 1. Fig. 3 is a similar view on the line $y\ y$ of Fig. 1. Fig. 4 is a section on the line $z\ z$ of Fig. 1.

A represents a saw formed with an inclined slot, $a$, one side of which is recessed at the point $a'$, so that the outer end, $a^2$, of the slot is narrower than the inner portion, $a^3$. One edge of the slot is formed triangular in cross-section, as shown at $a^4$.

B represents the detachable tooth, formed with the cutting-point $b$ and with a triangular groove, $b'$, adapted to receive the triangular edge of the narrow portion of the slot $a'$. Adjacent to the edge $b^2$ of the tooth the latter is recessed, and its end is beveled, as shown, at the point $b^3$, and the inner end of said tooth is formed with a notch, $b^4$, adapted to receive the beveled edge $a^5$ of the slot $a$. It will be observed when the tooth is thus secured in position a wedge-shaped space will be left between the tooth and one edge of the wide portion of the slot $a$. Within this space is adapted to be inserted a wedge, C, having grooved edges $c\ c'$, adapted to receive the triangular edges or tongues $b^3$ and $a^2$ of the tooth and slot, as shown.

This tooth is adapted to be securely held by forcing the wedge C against the beveled inner end of the tooth, and when it is necessary to remove the tooth the removal may be readily accomplished by withdrawing the wedge.

Having fully described my invention, what I claim is—

1. The combination, with a saw having an inclined slot formed narrow at its outer end and recessed at the point $a'$, of a detachable tooth and a wedge, said tooth and wedge being secured within said slot by tongue-and-groove connections, substantially as set forth.

2. The combination, with a saw having an inclined slot, $a$, provided with the triangular edges, and recessed at the point $a'$, of a detachable tooth adapted to fit within said slot, and beveled and notched at its inner end, and a grooved wedge adapted to secure said tooth within the slot, substantially as set forth.

In testimony whereof I affix my signature in presence of two witnesses.

ERNST THEODOR LIPPERT.

Witnesses:
   F. M. TIERNAN,
   C. BERINGER.